(12) United States Patent
Riordan

(10) Patent No.: US 6,996,719 B2
(45) Date of Patent: Feb. 7, 2006

(54) SECURE PASSWORD ENTRY

(75) Inventor: James Riordan, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 09/808,530

(22) Filed: Mar. 14, 2001

(65) Prior Publication Data

US 2002/0083328 A1    Jun. 27, 2002

(30) Foreign Application Priority Data

Mar. 15, 2000  (EP) .................................. 00105528

(51) Int. Cl.
*H04K 1/00*    (2006.01)
*H04L 9/00*    (2006.01)

(52) U.S. Cl. ........................................ 713/184; 380/44
(58) Field of Classification Search ................ 713/165, 713/184, 202; 705/67, 76, 72
See application file for complete search history.

(56) References Cited

U.S. PATENT DOCUMENTS

| | | |
|---|---|---|
| 5,091,939 A | 2/1992 | Cole et al. |
| 5,592,553 A * | 1/1997 | Guski et al. ................ 713/159 |
| 5,931,948 A | 8/1999 | Morisawa et al. |
| 6,141,760 A * | 10/2000 | Abadi et al. ................ 713/202 |

FOREIGN PATENT DOCUMENTS

| | | |
|---|---|---|
| DE | 40 08 971 A1 | 3/1990 |
| WO | WO 99/44133 | 2/1999 |

OTHER PUBLICATIONS

Schneier, Applied Cryptography, 1996, John Wiley & Sons, 2nd Edition, pp. 174, 429, and 436.*

* cited by examiner

*Primary Examiner*—Hosuk Song
*Assistant Examiner*—Paula Klimach
(74) *Attorney, Agent, or Firm*—Scully, Scott, Murphy & Presser; Louis P. Herzberg

(57) ABSTRACT

The invention provides a mechanism for a secure password entry by using cryptographic functions. This mechanism is applicable to the access of computers and programs. Upon a request of a program E a password p is read-in by receiving a program-specific identifier H(E) from the program E, receiving the password p, and generating from at least the program-specific identifier H(E) and the received password p a program-password-specific identifier F(H(E),p). The program-password-specific identifier F(H(E),p) is sent to the program E which then further processes the program-password-specific identifier F(H(E),p).

2 Claims, 2 Drawing Sheets

SECURE PASSWORD ENTRY

TECHNICAL FIELD

The present invention is related to a secure password entry. More particularly, the invention relates to a method and device for reading-in a password in a secure manner.

BACKGROUND OF THE INVENTION

Passwords and password protection schemes are commonly employed to control access to computer systems and programs. Each time a user wishes to use the computer or program he/she is asked to enter the password. If the password is valid, the user will be permitted to access the data and/or execute the programs. Persons not entering a valid password are denied to access the data or program information. In this way, a password protection system should protect the proprietary or confidential information retained by the computer and should prevent unauthorized use.

Since a user works with several computers and programs he is forced to remember many passwords. Many tend to re-use passwords accidentally or deliberately leading to security problems.

Most personal computers (PCs) and laptop computers can not solve sufficiently the problem of security by simply asking for a password. PC operating systems running on modern hardware, including DOS, Windows, and MacOS, have been assaulted by a barrage of viruses, Trojan horses, and other malicious software, also referred to as malware. The release and use of such malware has been essentially a form of vandalism and its danger grows with the use of the Internet. The security risk of downloading the above-mentioned Trojan horses becomes more serious and widespread and is often underestimated. Such Trojan horses are malicious files or programs that when being executed masquerade as a benign application and might control programs or even the entire system. Other malicious programs attempt to steal login names and passwords. These passwords are often then sent to anonymous e-mail addresses. In general, a Trojan horse is a program misrepresenting itself as doing a useful service.

It is often the fact that the user does not know exactly whether he/she inputs the password to the correct system or program. In a further safety problematic example, when the main power source is switched on, the display starts to display the display data stored in the video RAM. At this time, a password-input window is displayed on a part of the display screen. Therefore, anyone can obtain information concerning the interrupted data processing from the display data displayed in the background of the password-input window. In other words, an unauthorized user can obtain the information without inputting any password. On the other hand, it is possible for an unauthorized user to find the registered password in may systems by repeatedly inputting a password selected at random.

The form factor and usage characteristics of handheld devices, such as personal digital assistants, also abbreviated as PDAs, makes them extremely desirable for use in many e-commerce applications. The most advantageous feature of these PDAs resides in that everyone can easily use them by a simple operation irrespective of a place. On the other hand, wide spread of the PDAs tends to increase the opportunity of processing secret information. Therefore, sufficient consideration is required with regard to the security function. Conventionally, the security function is realized by programming the PDA to check a password input each time the power source is switched on. In this password check, inputting of a password is requested immediately after start of power supply, and then it is checked whether the input password coincides with a password previously registered. When coincidence is detected therebetween, the PDA or personal computer becomes active to start a data processing corresponding to an instruction input by the operator. Unfortunately, current PDA operating systems do not offer the needed security for e-commerce applications. The very fact that PDAs are powerful and general purpose computing devices renders them vulnerable to attack. E-commerce systems based upon PDAs are potentially vulnerable to an entire range of attacks which also can endanger other included systems, e.g. smartcards.

If one use such systems for economically meaningful transactions, there is far greater benefit and hence incentive for an attacker. Thus, the need for security is essential, whereby a call arises for an appropriate secure password entry mechanism.

U.S. Pat. No. 5,931,948 is related to a portable computer system having password control means for holding one or more passwords such that the passwords are unreadable by direct access from a main processor.

In U.S. Pat. No. 5,091,939 a method and apparatus for password protection of a computer is disclosed. Therein the user's password entry is compared to the value of a secondary password retained by the computer as well as the value of the user's stored primary password. The user may thus access the computer when his primary password is corrupted or forgotten by obtaining an alternate password from the computer manufacturer which matches the secondary password generated or stored by the computer. The operation of the method and the organization of the apparatus make the secondary and alternate passwords valid for a limited time, thereby preserving the overall integrity of the password protection system.

OBJECT OF THE INVENTION

It is an object of the present invention to overcome the disadvantages of the prior art and to increase security of password-protected computers and programs.

It is another object of the present invention to provide a secure password entry mechanism that unmasks malicious programs, such as Trojan horses, and prevent their execution.

It is still another object of the present invention to achieve that an inputted password is encoded in such a way that it is infeasible to recover said password.

It is a further object of the present invention to achieve that a user has to remember and apply only one password for several computers or programs, while security is given.

It is still a further object of the present invention to provide a personal computer that is able to read-in a password in a secure manner.

Glossary

The following are informal definitions to aid in the understanding of the following description.

Hash function is a computationally efficient function, mapping binary strings of arbitrary length to binary strings of some fixed length.

One-way hash function is a function which takes a variable-length message M or some data and produces a fixed-length value, also referred to as hash or specific identifier. Given the specific identifier, it is computationally infeasible to find a message with that specific identifier; in fact one can't determine any usable information about the message M with that specific identifier. In other words, the time to create such a specific identifier is substantially shorter than the time to reconstruct the variable-length message out of the specific identifier. Moreover, the time to find two identical specific identifiers is substantially longer than the time to create one specific identifier.

Trusted computing base (TCB) indicates the totality of protection mechanisms within a computer system, including hardware, firmware, and software, the combination of which is responsible for enforcing a security policy.

SUMMARY AND ADVANTAGES OF THE INVENTION

The objects of the invention are achieved by the features stated in the enclosed independent claims. Further advantageous implementations and embodiments of the invention are set forth in the respective subclaims.

The invention provides a general and flexible mechanism for a secure password entry. This mechanism is applicable to the access of computers and programs. When referring to a computer, any kind of computer is meant that has a trusted computing base, also abbreviated as TCB. Such a computer can be a member of a network and can support multiple secure domains or applications.

The basic idea of the invention is that a computer uses a cryptographic function to convert the inputted password to a substantially unique name, whereby a secure password entry is supported by the trusted computing base and indicated to the user by a signal, preferably an optical signal.

Such a cryptographic function can be a cryptographic checksum, also referred to as one-way-hash function, to automatically generate a program-specific identifier form a program that requires a password and a so-called program-password-specific identifier from the program-specific identifier and the inputted password. These identifiers or names are obtained by applying a hash function. In general, the names are generated by the trusted computing base or in more detail by an operating system wherein a generator-module is implemented. The cryptographic function fulfills at least the following criteria. The time to create such a specific identifier is substantially shorter than the time to reconstruct the program or part thereof out of the specific identifier. Moreover, the time to find two identical specific identifiers is substantially longer than the time to create one specific identifier.

The mechanism runs as follows. The program that requires a password sends a message including at least its generated program-specific identifier to a password-reading program provided by the operating system. The password-reading program prompts for a password and while this program reads-in the password a secure entry mode is indicated to the user. The program-specific identifier together with the received password is then transformed to the program-password-specific identifier. This transformed identifier is sent to the program which processes or leads further it as the requested password.

The present mechanism shows several advantages, such as it is unforgable, unsniffable, and cannot be spoofed. Moreover, the mechanism eliminates the problem of Trojan horses and allows that every application or program requesting a password can be given a unique password while allowing the user to remember only one password. In other words, a single password can be shared by several different applications or programs in a perfectly secure manner. In general, the trustworthiness of computers can be increased dramatically and make them to safe and reliable devices. Since several domains or applications can run one the same computer without being attackable by insecure programs.

By using the mechanism, uncontrolled and potentially insecure programs, such as suspected and attacking programs, cannot take control over the computer or interfere sensitive programs or data.

When the program-specific identifier has been derived by applying a first cryptographic function to the program requesting a password, and the program-password-specific identifier is generated by applying a second cryptographic function to the program-specific identifier and the at least part of the received password, then the advantage occurs that a substantially unique value that can be regarded as a transformed substantially unique password can be provided. This is only usable by the program which called for the password.

The first cryptographic function and/or the second cryptographic function comprises preferably a one-way-hash function, such as MD5 or SHA-1. Nevertheless, the applied hash functions can be also identical. Such hash function are well known, work reliable, and can be processed, i.e. applied to data or programs in the millisecond time scale, without any remarkable effect to the user or the computing time in general. It is also possible to apply the cryptographic function to at least part of the code of the program or data.

It proves advantageous if the password-reading program and the program-specific identifier are provided by means of a trusted computing base (TCB), preferably for both the same TCB, since then the environment can be trusted and the security can be increased.

It also proves advantageous if all I/O devices except the password input device are locked and other programs running on the computer are blocked while the password-reading program is executed and the password is received.

The fact that the password-reading program is executed based on the TCB is indicated via a signal. For example, while the password-reading program receives the password an LED might indicate a secure entry mode. By doing so, the user is informed that he inputs the password to the right program.

When the program-password-specific identifier is generated from the program-specific identifier, the received password, and an additional value, then the advantage occurs that this program-password-specific identifier characterizes the device or computer where the program-password-specific identifier is generated. If somebody observes the password entry and might know the password then however this password cannot be used at a different device or computer.

It is possible to use the program-password-specific identifier as a key to decrypt another program. Since the program-password-specific identifier is a substantially unique value, the key is safe and can be only generated by the user's device.

A hash-function generator should be implemented into the trusted computing base, such that the program-specific identifier and the program-password-specific identifier are derived and provided by this trusted computing base automatically. Based on the underlying security policy, the trusted computing base cannot be circumvented or undermined by an attacker.

DESCRIPTION OF THE DRAWINGS

The invention is described in detail below with reference to the accompanying schematic drawings, wherein.

Figure 1:
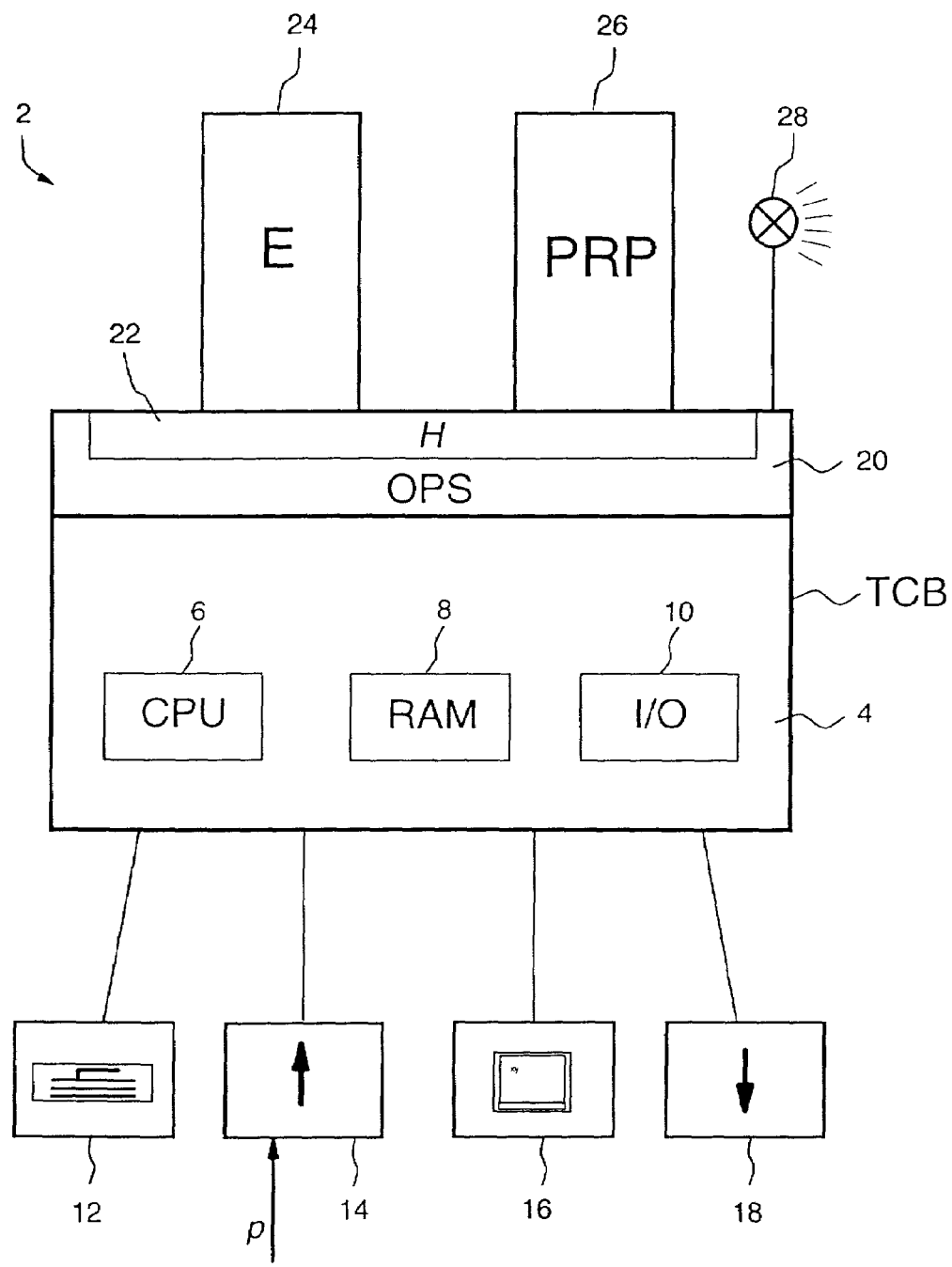
FIG. 1 shows a block diagram of a computer system according to the present invention.

All the figures are for the sake of clarity not shown in real dimensions, nor are the relations between the dimensions shown in a realistic scale.

DETAILED DESCRIPTION OF THE INVENTION

With general reference to the figures and with special reference to FIG. 1 the essential features of a secure password entry mechanism for computers using cryptographic functions is described in more detail below. At first, some general points are addressed.

Hash Function

A hash function is a computationally efficient function mapping binary strings of arbitrary length to binary strings of some fixed length.

One-way Hash Function

A one-way hash function is a function which takes a variable-length message and produces a fixed-length hash or value. Thus: h=H(M), with H the one-way hash function, M the message and h the hash value for message M. Given the hash h it is computationally infeasible to find a message M with that hash; in fact one can't determine any usable information about a message M with that hash. For some one-way hash functions it is also computationally infeasible to determine two messages which produce the same hash. Moreover, a one-way hash function can be private or public, just like an encryption function. MD5, SHA-1, and Snefru are examples of public one-way hash functions.

If such a one-way hash function is applied to a program E, which can be any program, than the output, the hash value h, is a substantially unique value, also referred to as program-specific identifier. This program-specific identifier can also be seen as a name that is given to the specific program E. In other words, the program E, that can be viewed as a byte stream E={$b_0, b_1, b_2, \ldots$}, can be associated with its substantially unique name H(E). Thus, the program E is running under the label H(E). Persistent data created by the program E is accessible only to the program E and also bears the name or program-specific identifier H(E).

Using for example the above mentioned one-way hash function SHA-1, the probability to find two identical program-specific identifiers is approximately 1 to $2^{80}$, and the probability to find to a given program another program with the same program-specific identifier is approximately 1 to $2^{160}$.

Trojan Horses

Users typically get Trojan Horses by downloading a program, e.g. from the Internet, that seems safe or promises the user something like free online time. Once it is downloaded and executed, the malicious code begins to work. The difference between Trojan Horses and traditional computer viruses is that Trojan Horses do not replicate or spread on their own. They can only be transmitted intentionally via e-mail or diskette or downloaded directly onto a PC. This means that, unlike a traditional computer virus, users are typically only affected once by a specific Trojan Horse. But this can lead to a large damage in view of security and data lost.

Trusted Computing Base (TCB)

Under trusted computing base, also abbreviated as TCB, is understood the totality of protection mechanisms within a computer system, including hardware, firmware, and software, the combination of which is responsible for enforcing a security policy. An operating system being part of the trusted computing base. The security policy requests that the trusted computing base cannot be circumvented or undermined, i.e. it is secure against attacks.

The present secure password entry mechanism can be used in general in computers and computer systems. When referring to a computer, any kind of device is meant that can be a member of a local network. Examples of devices are: laptop computers, workpads, nodepads, personal digital assistants (PDAs), notebook computers and other wearable computers, desktop computers, computer terminals, networked computers, internet terminals and other computing systems, set-top boxes, cash registers, bar code scanners, point of sales terminals, kiosk systems, cellular phones, pagers, wrist watches, digital watches, badges, smartcards, and other handheld and embedded devices. Other devices considered include: headsets, Human Interface Device (HID) compliant peripherals, data and voice access points, cameras, printers, fax machines, keyboards, joysticks, kitchen appliances, tools, sensors such as smoke and/or fire detectors, and virtually any other digital device.

Other examples of wearable computers that can be used in connection with the present invention are, personal effects being equipped with computer-like hardware, such as a "smart wallet" computer, jewelry, or articles of clothing. In addition to a "smart wallet" computer, there are a number of other variations of the wearable computers. A "belt" computer is such a variation which allows the user to surf, dictate, and edit documents while they are moving around. Yet another example is a children's computer which is comparable to a personal digital assistant for grade-school children. The children's computer might hold assignments, perform calculations, and help kids manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (vending machines, ticketing machines, automated teller machines, etc.) might be used in the context of the present invention.

In order to aid in the understanding of the present invention, FIG. 1 shows a high-level block diagram of a computer 2.

The computer 2 includes hardware components 4 such as one or more central processing units (CPU) 6, a random access memory (RAM) 8, and an input/output (I/O) interface 10. The computer 2 also includes an operating system 20 wherein a generator-module 22 is embedded. Various peripheral devices are connected to the computer 2, such as secondary storage devices 12, e.g. a hard drive, input means 14 or devices, such as a keyboard, a mouse, a touch screen, a microphone, or an infrared- or RF receiver, display devices 16, such as a monitor or an LCD display, and output devices 18, such as printers, or infrared- or RF transmitter. The user inputs a password p via the input means 14. Also a smartcard device could be coupled to the input/output devices 14, 18. A program 24 that requests a password and a receiver means 26, also referred to as a password-reading program 26, are executed on the computer 2. An indicator means 28 is connected to the operating system 20 and therewith also to the password-reading program 26, whereby only the operating system 20, i.e. the TCB, and the password-reading program 26 can control the indicator means 28. This indicator means 28 provides a signal to the user indicating that the password is inputted to the right program. A Light Emitting Diode 28, also abbreviated as LED 28, would be appropriate to show an optical signal to the user. Any suitable signal can be used instead.

The hardware components 4 and the operating system 20 form a trusted computing base, which constitute the basis for a secure and trusted computing. Into the trusted computing base, the generator-module 22 for creating program-specific identifiers and program-password-specific identifiers is implemented. This generator-module 22 is basically a cryptographic-function generator 22 that can be implemented in software as well as in hardware. Since the generation of a hash value by applying a hash function, preferably a one-way hash function as described above, is not time-consuming for a processor, the cryptographic-function generator 22 is here implemented in the operating system 20 itself. Any cryptographic-function might be suitable that outputs a substantially unique value.

The structure of the computer 2, as described with reference to FIG. 1, is to be seen as the underlying device, that can be used in the following embodiments. Thereby the same reference signs are used for the same components.

Figure 2:
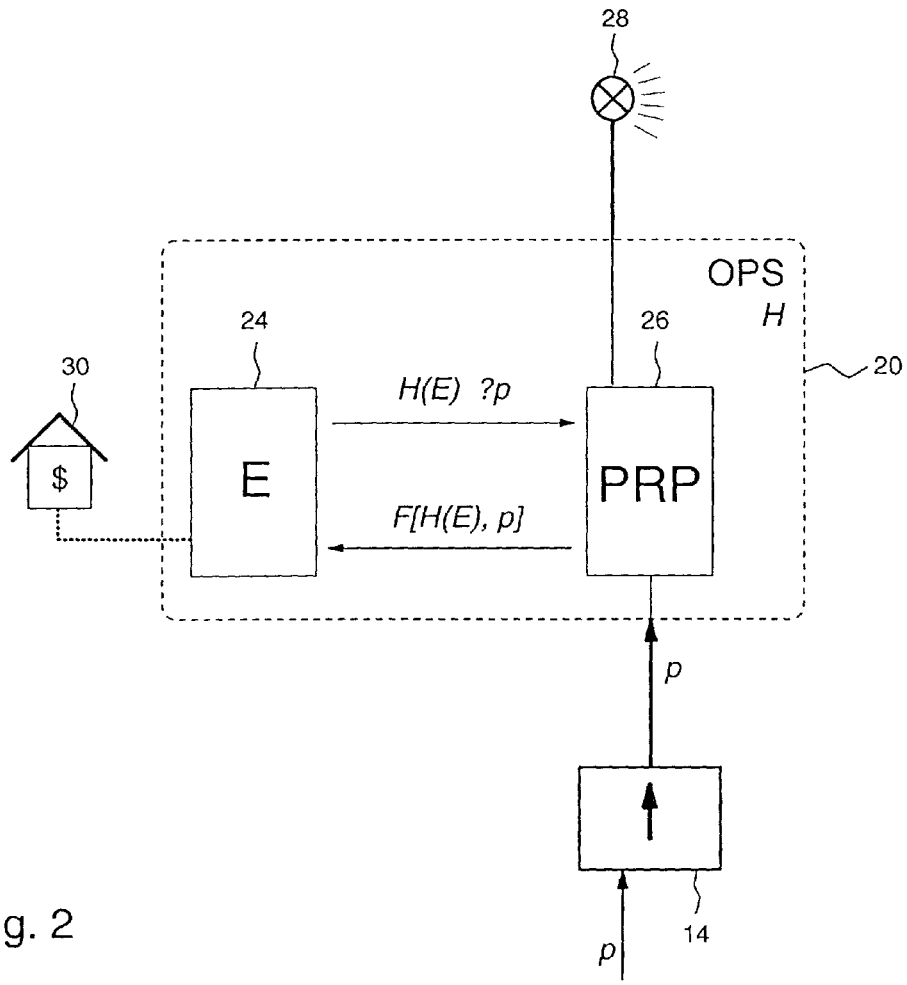
FIG. 2 shows a schematic illustration of a password entry according to the present invention.

Still referring to FIG. 2, which shows a high-level schematic illustration of a password entry according to the present invention. Based on the operating system 20 run the program 24 that requests a password entry and the password-reading program 26. The password-reading program 26 is provided by the trusted computing base and receives the inputted password p via the input means 14. The program 24 is connected via a network to a bank 30 which initially requests for the password entry. A transformed password F[H(E),p] has been pre-stored at the bank 30. Upon a request of the bank 30 for the transformed password F[H(E),p], the program 24 forwards this request to the password-reading program 26. For the sake of simplicity, the generator-module 22 is not shown in the FIG. 2. but the program-specific identifier H(E) and the program-password-specific identifier F[H(E),p] mare generated by the generator-module 22 and provided by the operating system 20. The program 24 sends a message to the password-reading program 26 including its derived program-specific identifier H(E) and the request or call for the password entry, as indicated by the arrow labeled with H(E) ?p. In other words, the request for the password is sent whereby the operating system 20 adds the program-specific identifier H(E) that has been derived by applying the generator-module 22 and therewith the above-mentioned hash function to the program 24 or at least part thereof. The password-reading program 26 and the operating system 20 then arrange that the LED 28 is switched on and all I/O interfaces except the password input device 14 are locked and other running programs are blocked. Now, the password-reading program 26 allows to read-in a password value or short password p. Afterwards, i.e. after receiving the password p at the password-reading program 26, the locks a released and the LED 28 is switched off. The generator-module 22 is applied to the program-specific identifier H(E) and the password p in order to generate the program-password-specific identifier F[H(E),p], also referred to as transformed password F[H(E),p]. By the way, also part of the program-specific identifier H(E) and/or the password p can be used. The transformed password F[H(E),p] is then sent from the password-reading program 26 to the program 24, as indicated by the arrow labeled with F[H(E)p], and forwarded to the bank 30 where it is verified with a pre-stored one, for example.

In a further embodiment, the program-specific identifier H(E), the password p, and an additional value s, not shown in FIG. 2, are transformed or hashed by the generator-module 22. By doing so, the transformed password F[H(E), p] becomes device-specific. That means, if somebody watches the password entry and knows the password he/she cannot use this password at a other computer or device for logging-in.

In general, to generate the program-specific identifier H(E) as well as the program-password-specific identifier F[H(E),p] the same cryptographic function can be applied.

Figure 3:
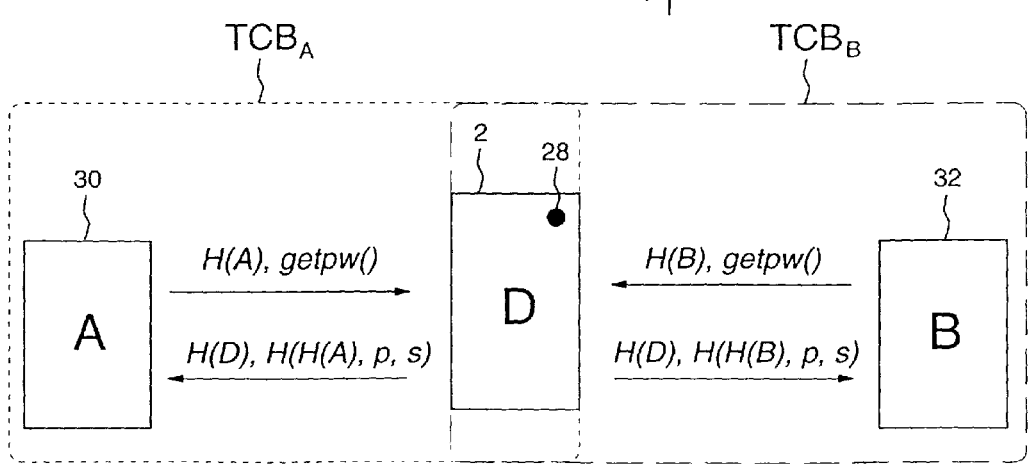
FIG. 3 shows a schematic illustration of another password entry whereby a malicious program is involved.

FIG. 3 shows a schematic illustration of another password entry whereby a malicious program B is involved. FIG. 3 shows a personal device 2, such as the computer as described with reference to FIG. 1, connected to a program A running at the bank 3 and the malicious program B running at a cracker 32. Moreover, FIG. 3 indicates a first trusted computing base $TCB_A$ comprising the personal device 2 and the program A and a second trusted computing base $TCB_B$ comprising the personal device 2 and the malicious program B. The personal device 2 is equipped with the LED 28 for indicating secure password entry. In this example, the programs A, B requesting the password entry are outside the personal device 2 and therewith outside the trusted computing base. As can be seen in FIG. 3, the bank's program 30 sends a password request getpw( ) together with its derived program-specific identifier H(A) to the personal device 2, as indicated by the arrow labeled with H(A), getpw( ). On the other hand, the malicious program B from the cracker 32 requests also a password, as indicated by the arrow labeled with H(A), getpw( ). The personal device 2 sends to the bank 30 a message comprising H(D), H(H(A), p, s), whereby H(A) the program-specific identifier of the program A, p the inputted password, and s a device-specific value are transformed or hashed by the generator-module 22 using function H to generate the transformed password H(H(A), p, s). For the sake of clarity, the generator-module 22 is not shown in FIG. 3. The device program-specific identifier H(D) of the personal device 2 is added to the transformed password H(H(A), p, s). On the other hand, the personal device 2 sends to the cracker 32 a message comprising H(D), H(H(B), p, s), whereby H(B) the program-specific identifier of the malicious program B, p the inputted password, and s the device-specific value are transformed or hashed by the generator-module 22 using the function H again to generate the transformed password H(H(B), p, s). It becomes clear that after the user has inputted the password p the transformed passwords H(H(A), p, s) and H(H(B), p, s) are never the same. Since the transformed password H(H(B), p, s) nothing reveals about the password p itself and it is infeasible to compute the password p out of H(H(B), p, s), the cracker 32 can nothing do with this transformed password H(H(B), p, s). The fact that the messages comprise the respective program-specific identifiers H(A), H(B), H(D) can be used to verify the validity of one program to another program. Mutual trust relationships between different programs can therewith be set up easily. That means for example, the personal device 2 has a list with program program-specific identifier which can be trusted. Requests from unknown programs or devices can be rejected.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A computer system for reading in a password and generating an encrypted password in a secure manner, the computer system comprising:

a central processing unit (CPU);

a random access memory (RAM);

an input/output (I/O) interface including a password input device for receiving a user password from a user;

an operating system including a cryptographic-function generator module for creating program-specific identifiers and program-password-specific identifiers;

a password request program;

a password reading program;

an indicator means connected to the operating system to provide a signal indicating that the user password has been inputted;

wherein the operating system, the CPU, the RAM, and the I/O interface form a trusted computing base (TCB);

the password request program being connected to a commercial entity that that asks for entry of the user password, said commercial entity pre-storing a transformed password F[H(E),p];

the password request program receiving the inputted user password from the TCB;

upon receiving a request from the entity for the transformed password, the password request program forwarding said request to the password reading program;

the generator module generating a program-specific identifier H(E) and a program-password specific identifier;

the password request program sending a message to the password reading program, said message including the program-specific identifier H(E);

in response to receiving said message the password reading program locks the I/O interface except for the password input device;

after the user password is received at the password reading program, i) said locks are released, ii) the generator module is applied to the program-specific identifier H(E) and the password p to generate a program-password specific identifier, and iii) the generated program-password specific identifier is then sent from the password reading program to the password request program, and forwarded thereby to the commercial entity to verify that the generated program-password specific identifier is the same as said pre-stored transformed password F[H(E),p];

wherein the program-specific identifier (H(E)) is derived by applying a first cryptographic function (H) to at least part of the code of the password program request, and the generated program-password-specific identifier is generated by applying a second cryptographic function (F) to the program-specific identifier (H(E)) and at least part of the received password (p), said first cryptographic function (H) and said second cryptographic function (F) each comprising a hash function.

2. A computer system according to claim 1, wherein only the TCB and the password reading program can control the indicator means, and said indicator means is a light emitting diode.

* * * * *